Patented Nov. 24, 1931

1,833,868

UNITED STATES PATENT OFFICE

KURT RIPPER, OF VIENNA, AUSTRIA, ASSIGNOR, BY MESNE ASSIGNMENTS, TO SYNTHETIC PLASTICS COMPANY, INCORPORATED, OF NEW YORK, N. Y., A CORPORATION OF DELAWARE

PROCESS FOR MANUFACTURING HYDROPHOBE RESINS BY CONDENSATION OF UREA WITH ALDEHYDES

No Drawing. Application filed February 25, 1926, Serial No. 90,686, and in Austria March 3, 1925.

In the manufacture of artificial masses from the condensation products of urea or its derivatives and aldehydes, especially formaldehyde, the removal of the water or other solvent involves considerable difficulties. While for instance the condensation of phenol and formaldehyde may be conducted in such a way, that the resulting condensation product is precipitated and that consequently the bulk of the water introduced with the raw materials or generated in the course of the reaction can be drawn off preliminarily to further heating of the resin, an analogous result could not be obtained in the condensation of carbamide and formaldehyde. On the contrary in this latter reaction at a given moment the entire mass including all the water present therein sets, and the water must subsequently be removed therefrom. This is due to the circumstance, that said condensation products show the characteristic behaviour of hydrophile colloids. The marked affinity between these colloidal complexes and the dispersion medium manifests itself even in the hardened final products. However carefully the removal of the solvent may have been effected, even if to such degree, that the final products are at normal temperature quite insensitive to these solvents, they will all the same be more or less affected by the action of the solvents at higher temperature.

Now I have succeeded in obtaining also by the reaction between urea and aldehydes as the product of the first reaction stage, a resin precipitated from the reaction mixture, which resin only includes a small percentage of the water, which is held in an exceedingly loose manner, so that this remainder can be easily expelled, when the heating is continued. According to the present invention the formation of such hydrophobe resin is brought about by adding to the initial condensation products made by heating the mixture of the raw materials for a short time, organic substances capable of forming with the aldehyde condensation products in an acid medium, such as for instance thio-carbamide or phenol, and heating the reaction mixture the hydrogen-ion concentration of which has been adjusted to a value upwards of $10^{-7}$ until the resin will be precipitated from the reaction mixture on cooling. The water settling above the precipitated resin can be poured away or drawn off. For the purpose of advancing the polymerization of the primarily generated condensation products besides free H'-ions also other polymerization catalysts may be employed simultaneously, which do not give rise to free OH'-ions, for instance the neutral salts of strong acids or of strong bases and particularly the neutral salts of the alkali earth metals.

In the U. S. patent application Serial No. 700,736, filed March 20th, 1924, is shown a process for the production of condensation products, characterized by the fact that the production of the colloidal initial condensation product of urea and formaldehyde is separated in two stages, the first stage involving the heating of a mixture of the raw materials while maintaining a hydrogen ion concentration which does not exceed $10^{-7}$. In a division of the aforesaid application, that is in Serial No. 38,920, filed June 22, 1925, the production of a hydrophobe colloid has already been described, but this colloid loses its hydrophobe nature by the subsequent step of stabilization, which for the further utilization of the product is advantageous or nearly indispensable and which is effected by the addition of substances having an alkaline reaction whereby the gelatinization is retarded. From neutral or alkaline solutions only traces of resin are precipitated. If on the other hand one avoids the stabilization, the precipitated hydrophobe product gelatinizes, owing to the high acid concentration necessary for its formation. Careful washing is under these circumstances impossible and some other difficulties will arise, as products gelatinized in such manner can only by most careful handling be transformed into hard artificial masses. In contradistinction thereto the resin made according to the present process is precipitated from neutral or alkaline solutions. As this resin is very stable, it can be perfectly freed from the enclosed electrolytes and crystalloids by washing with water or with other solvents. This is a special additional advantage of the process, as certain electrolytes and crystalloids most unfavorably influence the properties of the artificial masses made of the resins.

The hydrophobe resin thus obtained can be transformed into artificial masses by any of the known methods and if desired organic as well as inorganic substances influencing the properties of the final product, may be admixed. Owing to its particularly high viscosity it is capable of taking up a nearly unlimited amount of different colloidal or non-colloidal dispersions and furthermore also powdery or fibrous filling materials, particularly cellulosic materials.

The appearance of the hardened final product differs in no way from that of the hitherto known condensation products of urea and formaldehyde, but the artificial masses made of really hydrophobe resins are, owing to their insensitiveness towards water vapors at high temperatures, far superior to the known artificial masses made of like resins. They are hydrophobe to such high degree, that they are capable of giving off water without deterioration even if surrounded by hot water vapors. This property renders these artificial masses adapted for many purposes, for which formerly similar condensation products could not be employed. Moreover the artificial masses made from really hydrophobe resins show a particularly high electrical insulation capacity.

For manufacturing lacquers the hydrophobe resins precipitated in the above described manner are dissolved in an organic solvent with or without the addition of tempering (softening) agents or of filling materials. Such lacquers show the special advantage of drying very quickly even in the cold, their field of application being thus widely enlargened.

As an addition, which is capable of reacting with the aldehyde used (say formaldehyde) to form condensation products in an acid medium, also urea may be used or some substance which forms urea which may be added at the very beginning to the reaction mixture. So for instance in the condensation between urea and formaldehyde the generation of a hydrophobe resin can be brought about by introducing after heating the mixture of the raw materials for short time a further amount of carbamide into the reaction. As carbamide in acid medium forms white condensation products, the resulting resin will in such case by hardening furnish white milkglass-like masses.

*Examples*

1. A neutral or slightly alkaline mixture of 1500 parts by weight of urea and 4000 parts by weight of a solution containing 37.6 per cent by weight of formaldehyde is for short time heated in a boiler provided with a reflux condenser. After addition of 2 parts by weight of formic acid 300 parts by weight of thio-urea are introduced into the mixture in several portions, whereafter the heating of the mixture in the said boiler with reflux condenser is continued for about 1 to 1½ hours. Then about 2 parts by weight of a fixed alkali are added and the mass is allowed to cool down. After short time a white resinous product will begin to be precipitated from the neutral or slightly alkaline solution, which product remains unaltered for an extended period of time. When the resin is precipitated, for the purpose of perfecting the precipitation preferably 2000 parts by weight of water may be added and well mixed with the resin by thoroughly kneading them and the water decanted off. This manner of washing is repeated several times. The resin thus purified can now be utilized for making lacquers or hard artificial masses.

For this latter purpose the resin may be poured directly into molds and can be hardened by increasing the temperature after addition, if desired of the customary substances (filling materials, coloring matter etc.). Moreover the resin may be freed from part of the water having remained therein by distillation effected prior to the hardening. By such distillation a highly viscous product is obtained, which at temperatures below 50° centigrade remains in an unaltered state. Being poured into molds and subjected to increased temperatures it will soon form a clear, colorless jelly and then will harden to a solid, transparent, crystal-like mass.

2. Instead of 300 parts by weight of thio-urea 200 parts by weight of phenol may be added and then operations continued in the manner above described. Also in this way a soft, kneadable resin is generated, which is stable for unlimited time and which may also be utilized in the manner described in Example 1 for making glass-clear, transparent artificial masses.

3. Moreover, instead of the 300 parts by weight of thio-urea 230 parts by weight of urea may be added. The final product resembles milk glass.

4. For producing lacquers 100 parts by weight of the washed resin obtained by the method according to Example 1 are dissolved in 30 to 40 parts by weight of aceton. As tempering (softening) agent 3 parts by weight of a cellulose ester may be added, dissolved in an ethyl ester of lactic acid, benzyl-alcohol or the like.

For producing artificial masses it has already been proposed to carry on the condensation of urea and formaldehyde in the presence of acids (or of non alkaline acting salts) and of organic substances of acid nature, which will react themselves with formaldehyde, such as for instance phenol. If the mass thus produced is heated up until it will become nearly thickly liquid and then it is allowed to cool down, setting will take place with all the water remaining included therein. A separation into layers of a resinous and of a watery phase cannot be obtained in this way. On the contrary, an essential condition for the formation of the above described hydrophobe resin is that the appropriate organic substances, capable of forming condensation products with formaldehyde in an acid medium, be only added, when the condensation products primarily generated by short heating of the mixture of urea and formaldehyde have already been formed.

From the process according to the U. S. A. Patent No. 1,507,624 dated Sept. 9, 1924, to Fritz Pollak and Kurt Ripper the present invention differs in that the prior process aims only at removing subsequently from the mass those quantities of formaldehyde which had not combined in the course of the reaction, as the presence of free formaldehyde therein would disturb the hardening of the mass. For this reason substances capable of combining with formaldehyde or of decomposing it are added to the reaction mixture after the formation of the colloid. In contradistinction thereto according to the present invention the organic substances capable of forming condensation products with formaldehyde in an acid medium must be introduced immediately after the first phase of the first reaction stage, that is to say after short heating of the mixture of the raw materials, so that the condensation products generated thereby will enter into the further polymerization of the initial condensation products.

I wish it to be understood that I do not desire to be limited to the exact details and proportions as described, for obvious modifications will occur to a person skilled in the art.

In the following claims I use the term "urea" to include also derivatives of urea.

What I claim is:

1. A process of producing a hydrophobe resin from urea and an aldehyde which comprises carrying out the reaction for the production of the hydrophobe resin product in two steps, in the first of which steps a condensation solution is produced in a non-acid solution by a short warming of the mixture of the initial substances, and in the second of which steps said condensation solution is made acid and heated further with a material selected from the group consisting of thio-urea and urea.

2. A process of producing a resinous condensation product which comprises first reacting on a urea with formaldehyde in a non-acid solution, until an intermediate water-soluble condensation product is produced, heating such intermediate reaction product in the presence of acid with a material selected from the group consisting of urea and thio-urea, and then neutralizing the said condensation solution.

3. A new hydrophobic resin comprising the product obtained by first reacting on aldehyde with urea in neutral medium to obtain a condensation solution, then reacting thiourea with said condensation solution after acidification of said solution, and neutralizing said condensation solution.

4. A new hydrophobic resin comprising the product obtained by first reacting formaldehyde with urea in a neutral medium to obtain a condensation solution then reacting thiourea with said condensation solution after acidification of said solution, with formic acid, and neutralizing said condensation solution.

5. A resin produced by reacting urea and formaldehyde in a non-acid medium, then acidifying and adding thiourea and continuing the condensation reaction.

6. A resin produced by reacting urea and formaldehyde in a non-acid medium, then acidifying and adding thiourea and continuing the condensation reaction and removing water by distillation.

7. A resin produced by reacting urea and formaldehyde in a non-acid medium, then acidifying and adding a material from the group consisting of urea and thiourea and continuing the condensation reaction.

8. A resin produced by reacting urea and formaldehyde in a non-acid medium, then acidifying and adding a material from the group consisting of urea and thiourea, continuing the condensation reaction and removing water by distillation.

In testimony whereof I have affixed my signature.

KURT RIPPER.